Dec. 20, 1938.   M. SCHLENKER   2,140,925
AUTOMOBILE CLOCK
Filed March 31, 1937   2 Sheets-Sheet 1

INVENTOR.
Max Schlenker
BY
ATTORNEY.

Dec. 20, 1938.    M. SCHLENKER    2,140,925
AUTOMOBILE CLOCK
Filed March 31, 1937    2 Sheets-Sheet 2

INVENTOR.
Max Schlenker
BY
ATTORNEY.

Patented Dec. 20, 1938

2,140,925

UNITED STATES PATENT OFFICE 2,140,925

AUTOMOBILE CLOCK

Max Schlenker, La Salle, Ill., assignor to General Time Instruments Corporation, New York, N. Y., a corporation of Delaware Application March 31, 1937, Serial No. 134,027

5 Claims. (Cl. 240—2)

My invention relates to automobile clocks and has for its object the production of an automobile clock that is mounted in the door of a compartment preferably in the dash board of the automobile and which clock has mounted within its casing an electric light operated by the starting battery of the automobile that illuminates the dial of the clock without the usual glare so that it can be readily and easily seen by the operator at night.

A further object of the invention is the production of a means associated with the said light that illuminates the dial, to further illuminate the said compartment in the dash board when the door thereof is opened to permit the operator to remove or put in articles in said compartment at night.

A further object of my invention is the production of such a combination of dial and compartment lighting from a single source of light that is extremely simple and inexpensive to produce and which is positive and effective in illuminating both said dial and said compartment when said compartment is substantially open for inspection.

I accomplish these objects by the means shown in the accompanying drawings in which.

Similar numerals represent the same parts throughout the several views.

Figure 1:
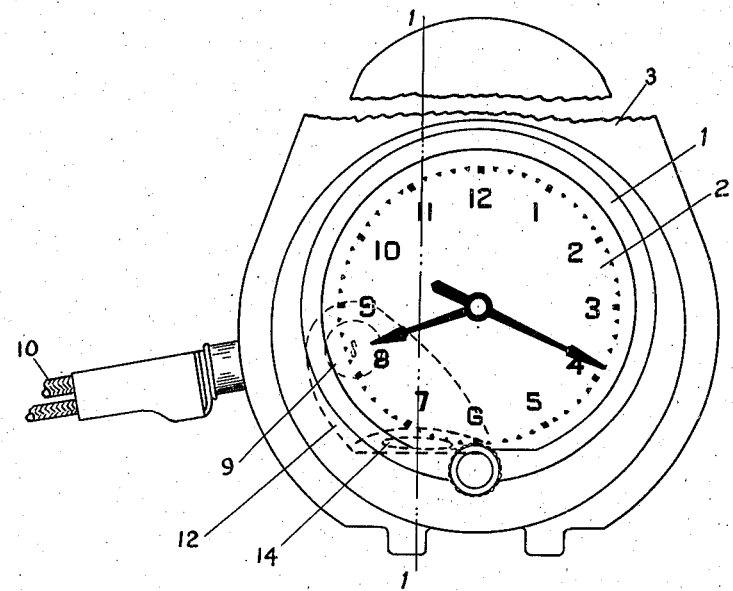
Fig. 1 is a partial front view of a clock mounted on the door of dash board compartment, with shutter mechanism indicated by dotted lines, as shown.

In the accompanying drawings 1 represents an electric automobile clock having a dial 2 mounted by means of a plate 3 to the door 4 of compartment 5 formed in the dash board 6 of an automobile. Said compartment door 4 operates on the hinge 7, as shown. The dial 2, as above mentioned, may be illuminated in such a way that the hands and the dial will be distinctly visible at night. As my invention broadly contemplates the use of any and all means for illuminating the dial of the clock and the compartment associated with the clock from a single light source means I have not shown any of the specific means employed for illuminating said dial.

Mounted within the clock case 8 of the clock 1 is the electric light bulb 9, which is serviced by the conduit wires 10 from the usual starting battery of the automobile, not shown. In the back part of said clock case 8, and adjacent to light bulb 9, is an aperture 11 through which projects the housing 12 with means for fastening it to said casing, as shown. Said housing 12 has a flat face 13, more or less substantially slightingly inclined with the horizontal axis of the clock 1. In said face 13, is an aperture 14, which is covered by the window pane 15 composed of preferably a transparent material such as celluloid or glass which may be shaped to disperse the light rays to illuminate the larger space of the compartment from the small light source.

Figure 3:
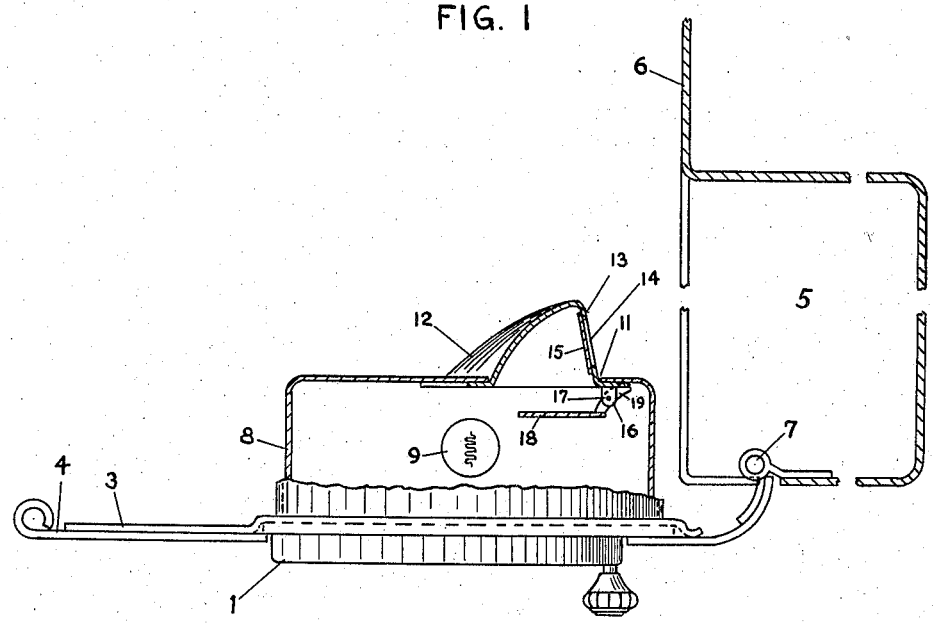
Fig. 3 is a partial similar sectional view, showing said clock mounted on the compartment door in its opened position.

Integral with the housing 12, are the projections 16 in which the shaft 17 is journally mounted. A shutter member 18 having a projection 19 is mounted on said shaft 17, as shown. Said projection 19 is so disposed as to serve as a stop against the inner surface of housing 12, to limit the rotation of the shaft 17 when the door of the compartment is opened as shown in Fig. 3, thus positioning said shutter 18 away from the window 15 (see Fig. 3) and to be ready to drop shutter 18 against window 15 when the door 4 is raised to its vertical or closed position.

Figure 2:
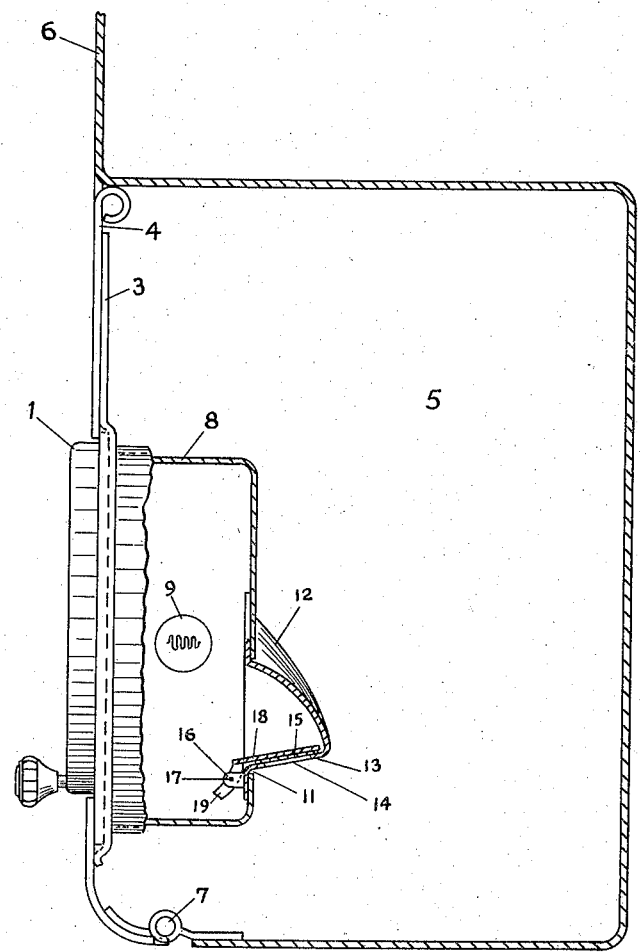
Fig. 2 is a partial sectional view, showing said clock mounted on the compartment door in its closed position along a line 1—1 of Fig. 1.

The operation of my device is as follows:

When the door 4 of the dash board compartment 8 is in its closed (vertical) position, (see Fig. 2) the shutter member 18, is, by the force of gravity, caused to assume a position parallel with the flat face 13 of the housing 12 and contiguous to the window 15, thus completely covering the aperture 14 to prevent the passage of any light through said aperture 14 from the light bulb 9 within the clock case 8.

When the compartment door 4 is in this position (Fig. 2), the only passage of light is through the front of the clock 1 to illuminate the dial 2. The upper surface at the shutter 18 may be highly polished and plated to a mirror finish to assist in reflecting the light to more efficiently illuminate the dial.

When the compartment door 4 is opened to assume the position shown in Fig. 3, the force of gravity causes the shutter member 18 to drop away from the window 15, permitting the light from the light bulb 9 to pass through the window 15 and aperture 14 to illuminate the interior of the compartment 5. It will thus be seen that when the door of the compartment 5 is opened at night that the compartment is automatically lighted by means above described.

It will be understood, of course, that while I have here shown one form of my invention, I do not wish to limit myself to the exact form shown but desire to have it taken in a sense illustrative of any and all forms of my invention as come fairly within the scope of the appended claims.

I claim:

1. In an automobile, a compartment, a door for said compartment, a clock casing having an aperture fastened in said door, a dial in said casing, a light in said casing for illuminating said dial, and means adaptable for opening said aperture when said door is in its substantially open position whereby said compartment is simultaneously illuminated by means of said light.

2. In an automobile, a compartment, a door for said compartment, a clock casing having an aperture fastened in said door, a dial in said casing, a light in said casing for illuminating said dial, and movable means adaptable for opening said aperture when said door is in its substantially horizontal position whereby said compartment is simultaneously illuminated by means of said light.

3. In an automobile having a dashboard, a compartment having a door in said dash, a clock including a casing having an aperture and a dial mounted in said door, an electric lamp mounted within said casing for illuminating said dial, movable means adaptable for opening said aperture when said door is in its substantially horizontal position whereby said compartment is simultaneously illuminated by means of said lamp, and means for lighting said lamp.

4. In an automobile, a compartment, a door for said compartment, said door having an opening, a clock with a casing having an aperture and including a dial mounted in the opening in said door, a light mounted within said casing for illuminating said dial, and movable means adaptable for opening said casing aperture when said door is in a substantially horizontal position whereby said compartment is simultaneously illuminated by means of said light.

5. The combination with an automobile dash board of a compartment in said dash having a door, a clock including a dial and a casing mounted in said door, said casing having an aperture normally closed by a shutter, a light in said casing for illuminating said dial, and means for automatically removing said shutter from said aperture to illuminate the interior of said compartment by said light when said door is opened.

MAX SCHLENKER.